Oct. 14, 1930.    H. K. RUTHERFORD    1,778,201
COMPUTING DEVICE
Filed Aug. 22, 1924    5 Sheets-Sheet 1

Inventor
Harry K. Rutherford
By W. N. Roach
Attorney

Inventor
Harry K. Rutherford
By W. N. Roach
Attorney

Oct. 14, 1930.  H. K. RUTHERFORD  1,778,201
COMPUTING DEVICE
Filed Aug. 22, 1924   5 Sheets-Sheet 4

Inventor
Harry K. Rutherford
By W. N. Roach
Attorney

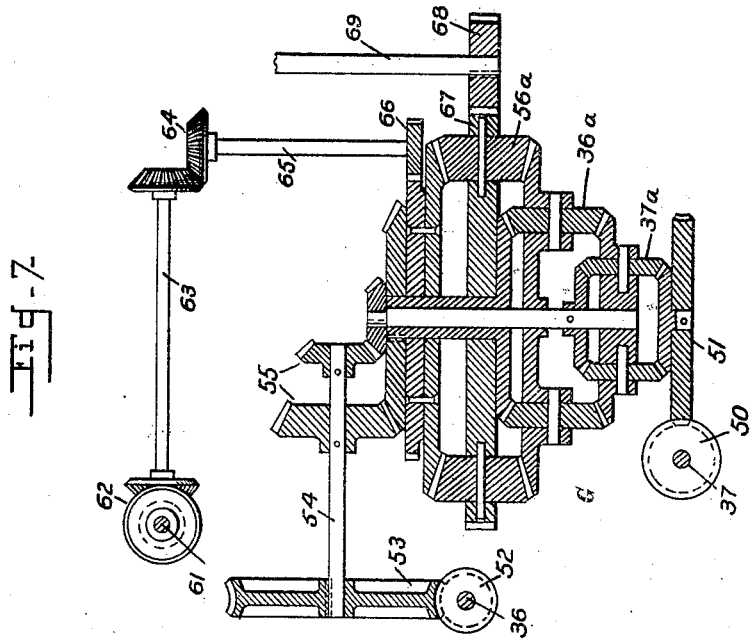
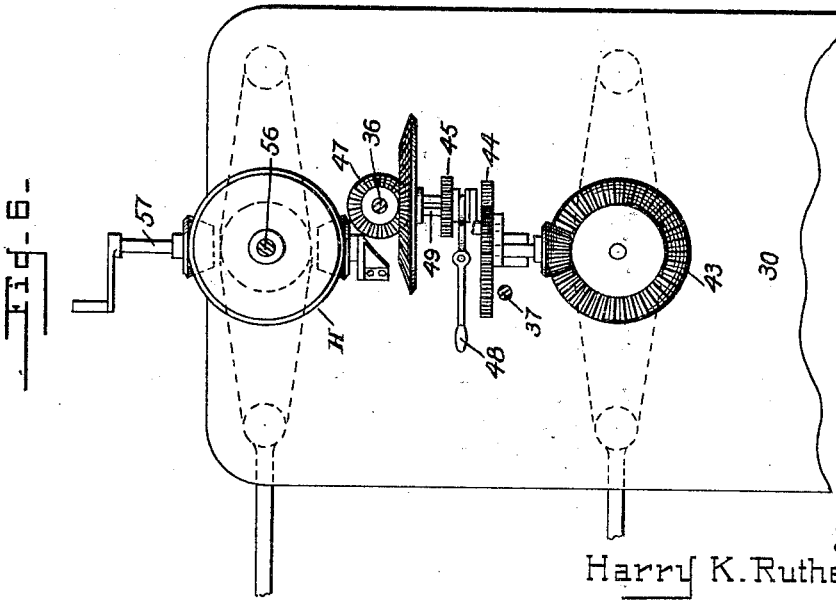

Patented Oct. 14, 1930

1,778,201

UNITED STATES PATENT OFFICE

HARRY K. RUTHERFORD, OF CAMBRIDGE, MASSACHUSETTS

COMPUTING DEVICE

Application filed August 22, 1924. Serial No. 733,596.

(GRANTED UNDER THE ACT OF MARCH 3, 1883, AS AMENDED APRIL 30, 1928; 370 O. G. 757)

The invention described herein may be manufactured and used by or for the government for governmental purposes without the payment to me of any royalty thereon.

The subject of this invention is a computing device designed primarily for determining the distance of a moving target, such as an aeroplane, from an observing station, after the lapse of a given period of time, so that the information may be available in adjusting the sighting mechanism of a gun, a time fuse, or other device.

The device constituting the subject matter of this invention pertains, more specifically, to that class of computing apparatus designed especially for the solution of such equations as the following:

$$A_1 = A_0 + f'(A_0)t + f''(A_0)\frac{t^2}{2} + \ldots f^n(A_0)\frac{t^n}{n} \quad (1)$$

Where $A_1$ is the desired value after the lapse of $t$ seconds of a variable quantity whose value at time $t=0$ is $A_0$, $f'(A_0)$ being the first differential of $A_0$ with respect to time, and $f''(A_0)$ the second derivative of $A_0$ with resepect to time.

As an example of the class of problems the device is adapted to solve, we may take that of a freely falling body, in which $A_1$ would represent the desired distance of the falling body from an assumed origin at the end of the time $t$; $A_0$ would represent its distance from the origin at time $t=0$; $f'(A_0)$ would represent the velocity possessed by the body at time $t=0$; $f''(A_0)$ the rate of change of this velocity or, in other words, the acceleration at the time $t=0$.

It is evident that in the case of a falling body, the value of $A_1$ in the above equation is equal to the sum of $A_0$, $f'(A_0)t$ and $f''(A_0)\frac{t^2}{2}$, all the succeeding terms being zero. In other applications of the invention, higher derivatives than the second may need to be considered, and the device to be described is adapted to such needs, but for the present description, only the quantities $A_0$, $f'(A_0)t$ and $f''(A_0)\frac{t^2}{2}$ will be considered as necessary for the computation of $A_1$.

It is apparent that if the value of $A_0$ or its derivatives would not change rapidly, a very simple computing device or a manual calculation would suffice to determine the value of $A_1$. For the purpose intended, namely that of predicting the future position of a moving target, the value of $A_0$ is continually changing at a more or less rapid rate; the value of $f'(A_0)$ is likewise changing, but at a slower rate; while it has been found sufficiently accurate to consider the value of $f''(A_0)$ to be practically constant. Hence the device as described will omit from consideration all derivatives higher than the second and will also omit any means for changing the second derivative continuously, leaving such changes as are necessary to be made by hand. Greater accuracy in the computation by considering derivatives higher than the second in the equation above given, may be obtained, if desired, but have been found an unnecessary refinement for the purpose in view.

The apparatus is so devised that the only data neeeded to be set into it are continuous values of $A_0$ and the value of $t$. The device will then, as will appear from the following description, automatically obtain from the values of $A_0$, the value of the derivatives needed, will multiply the first and second derivatives by $t$ and $\frac{t^2}{2}$ respectively, add the results to $A_0$ and hence give the desired value of $A_1$ by a mechanical solution of Equation (1) above.

One example of the use to which the present invention may be put is that of determining the future value of one of the changing dimensions or coordinates used in defining the position of an aerial target in space with reference to a gun so that allowance may be made in laying the gun and setting the fuse of a projectile to compensate for time of flight and dead time of maneuver. These dimensions are the horizontal angle of azimuth; the vertical angle or angular height; and either altitude or slant range which may be combined with the vertical angle to locate a point in space. More specifically the apparatus will compute the value of one of these factors at $t$ seconds from the time when its value is $A_o$, assuming that continuous values of $A_o$ are available up to the time $t=0$; that the value of $t$ is known, and that the motion of the aeroplane is such that the first and second derivatives of $A_o$ are not zero, which assumptions are those ordinarily obtaining under actual conditions.

While in the preceding paragraph the assumption is that the derivatives after the second are too small in value to require consideration, it will be evident from the following that this assumption is only for convenience and that the number of terms in the right hand member of Equation (1) may be made large enough to give any desired degree of accuracy.

The mechanism for accomplishing the foregoing objects comprises a plurality of driven members and speed control mechanisms representing terms of the equation to be solved, the motion of one of the driven members and of the speed control mechanisms being communicated to a differential and the differentials interrelated to mathematically combine the separate terms of the equation and to transmit motion to a shaft with a velocity equal to the summation of their velocities. The shaft may be connected to such other mechanisms as may be needed for computing purposes.

To these and other ends, my invention consists in the construction, arrangement, and combination of elements, described hereinafter and pointed out in the claims forming a part of this specification.

A practical embodiment of my invention is illustrated in the accompanying drawing, in which, Fig. 1 is a plan view of a computer constructed in accordance with the invention, parts in section;

Fig. 6 is a sectional view taken on the line 6—6 of Fig. 4;

Fig. 7 is a sectional view taken on the line 7—7 of Fig. 4;

Fig. 10 is a detailed sectional view showing the method of supporting the auxiliary driven member;

Fig. 11 is a detailed sectional view of the roller bearings; and

Figure 1:
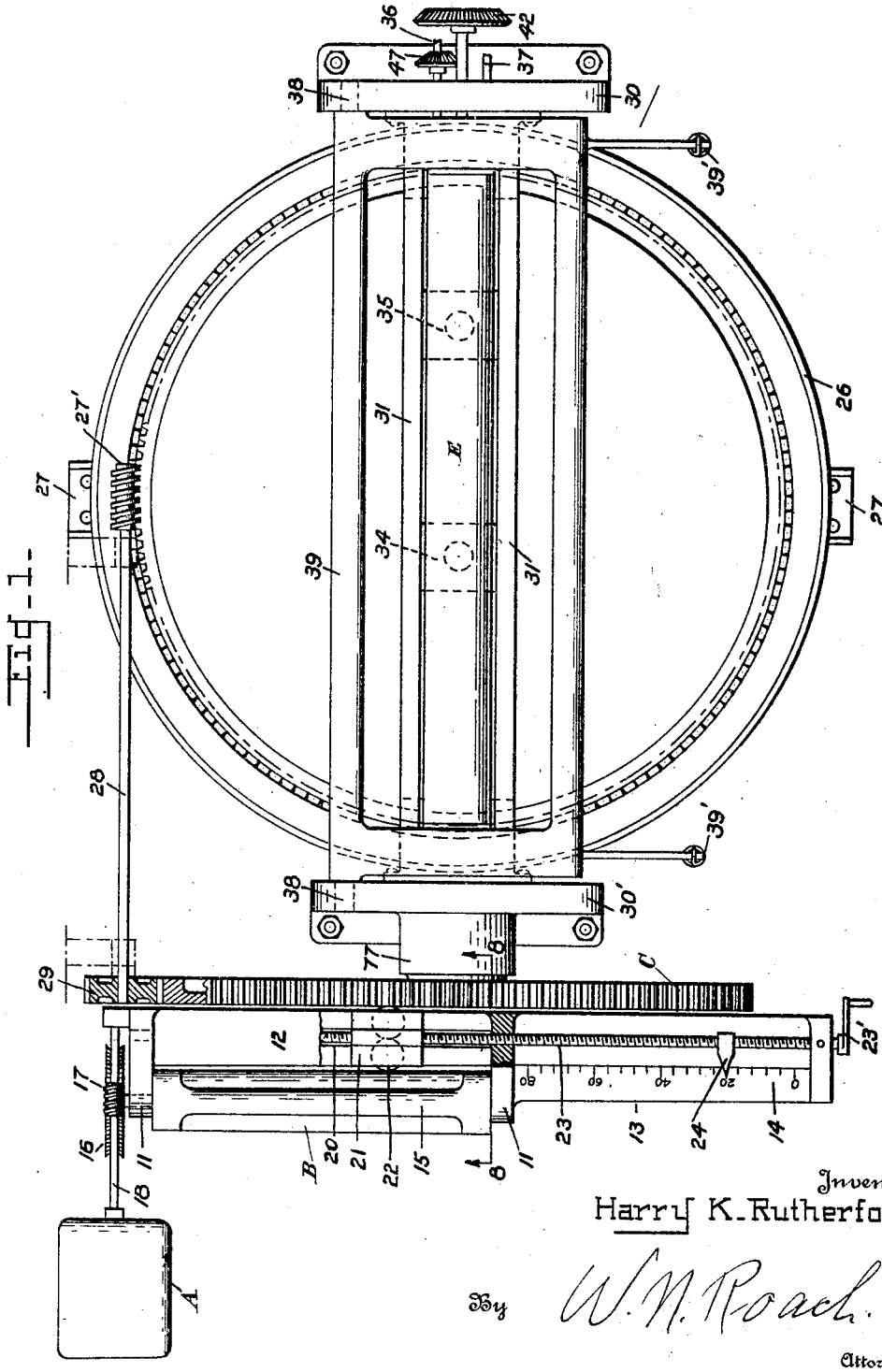

Referring to the drawings by numerals of reference:

The driving element of my computing device is carried by an upright support 10, which may be formed with projecting arms or brackets 11—11 and spaced rails 12 and 13, the lower rail 13 extending laterally of the support and having a scale 14 graduated in units representing seconds of time.

Figure 2:
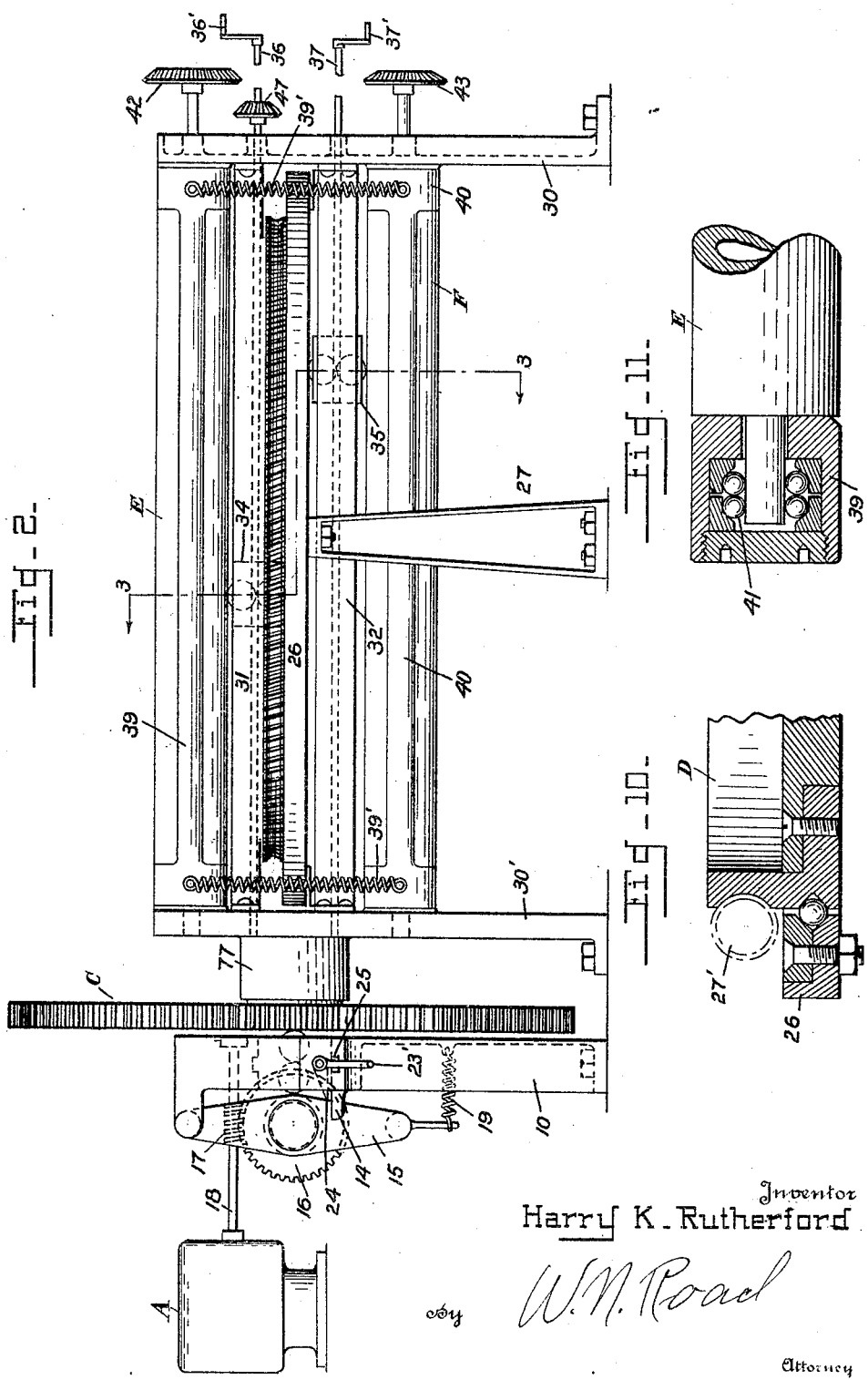
Fig. 2 is a view of the same in side elevation.

Pivotally supported by the arms 11 is a roller cage 15, in which is rotatably mounted a roller B operated by suitable gearing, specifically, a wormwheel 16 connected to a trunnion of the roller, which is engaged by a worm 17 on a shaft 18 driven from a source of power A and journaled in the support 10. The roller cage maintains the roller B, which may be considered as the driving member, in engagement with a friction drive through resilient means such as a spring 19 secured to the lower end of the roller cage and to the support as shown in Figure 2.

The source of power A may be a motor of any description so regulated that its speed is as nearly constant as may be required by the degree of accuracy to be obtained.

Slidably disposed between the rails 12 and 13 and working in guide grooves 20 formed therein is a cage 21 enclosing a friction drive 22, preferably consisting of a pair of hardened balls freely movable in the cage, one of the balls being in contact with the roller B and the other in contact with a separately mounted primary driven member C formed with gear teeth about its periphery. The ball cage 21 is movable in its guides through the entire length of the driving member B by means of a threaded control shaft 23, threaded through the ball cage 21 and journaled in opposite ends of the support 10. The control shaft 23 may be provided with a crank handle 23′, positioned adjacent the upturned end portion of the lower rail 13 to facilitate manipulation.

The axis of the driving member B is disposed at right angles to the axis of rotation of the driven member C and may be contained in the same plane therewith and the friction drive 22 being movable along a radius of the member C, a variable speed drive for the latter is provided. The position of the friction drive at any point in its movement is indicated on the scale 14 by a pointer 24 threaded on the control shaft 23 and held against rotational movement by a lug 25 riding in the guide groove 20 of the lower rail 13 as shown in Figure 2.

Since the speed of the driving member B is constant, the speed of rotation of the driven member C will depend upon the distance from its center of the ball cage, being at a maximum when the pointer reads zero and at a minimum when the pointer reads 80. Furthermore, since the scale 14 is graduated in units assumed to be seconds of time, it is evident that the rotational speed of the driven member C for any given size of parts, will be inversely proportional to the setting of the time scale and the speed of the member C will therefore be proportional to $1/t$.

The driven member C is supported for rotation by a shaft 70 carried by the axle 71 of the member C and loosely fitted in the standard 30'. The member C is forced into contact with the friction drive 22 by means of pairs of concentric rings 72 and 73 spaced by ball bearings 74, and each pair of rings urged by a spring 75 in opposite directions to abut the standard and an annular shoulder 76 in the axle 71. A housing 77 formed integrally with the standard 30' encloses the axle assembly.

While there has been indicated above a variable speed control mechanism between the motor A, assumed to be running at constant speed, and the driven members C, for the purpose of driving the member C at speeds proportional to $1/t$, the same result may be obtained by connecting a motor directly to the driven member C and arranging to suitably vary the speed of the motor itself by any well-known method. However, it is considered that either a constant speed motor with a variable speed drive, or a motor whose speed may be varied is equally applicable to the present invention. As will appear more clearly in the following description, it is only necessary for the primary driven member C to be operated at a speed which is variable in proportion to $1/t$ regardless of the method of obtaining the speed variation.

Figure 3:
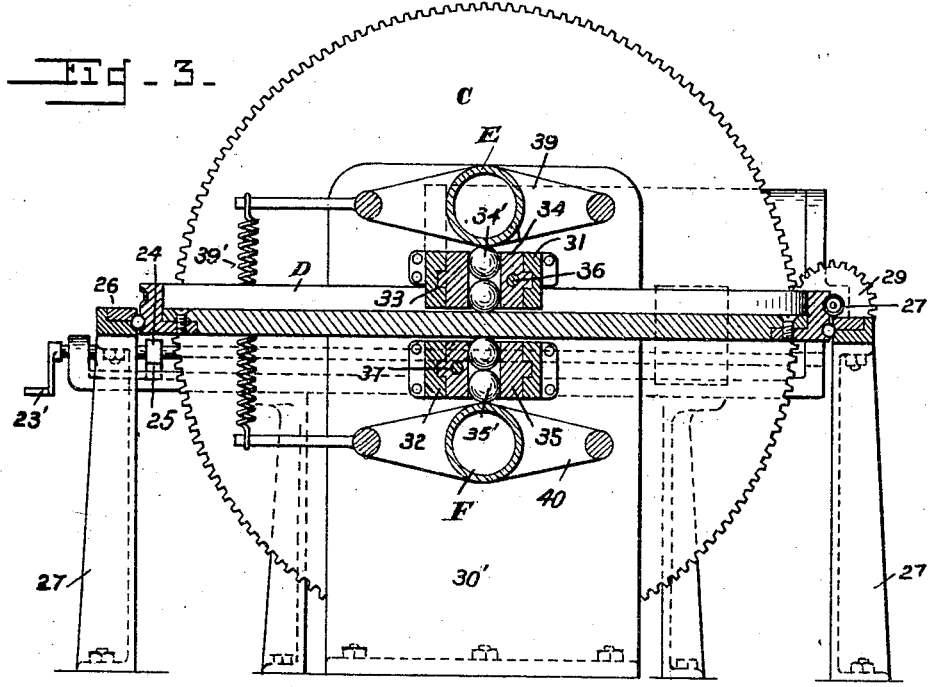
Fig. 3 is a sectional view taken on the line 3—3 of Fig. 2.
Figures 8, 9:
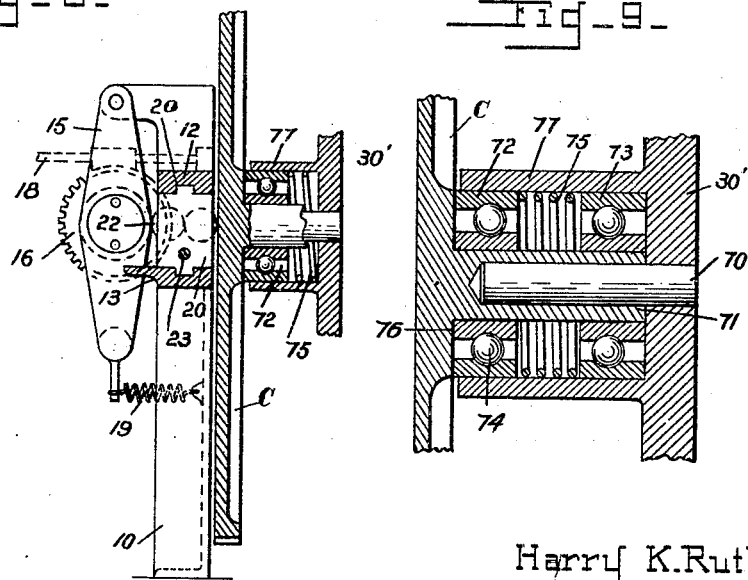
Fig. 8 is a sectional view taken on the line 8—8 of Fig. 1.
Fig. 9 is a sectional view taken through the axle of the primary driven member.

A member D is associated with the member C from which it receives motion preferably at the same speed as the member C. This member D may be in the form of a disc, supported for rotation in a ball bearing ring 26 carried by pedestals 27 as shown in Figures 3 and 10. The disc D is provided with worm teeth about its periphery by means of which it is driven in rotation through the action of a worm 27' attached to a suitably supported shaft 28 which is driven by a gear 29 meshing with the geared periphery of the primary driven member C. The member D is, therefore, also driven at a speed proportional to $1/t$.

Secured to standards 30 and 30' and positioned above and below the member D parallel to the axis of the member C are pairs of spaced rails 31 and 32 respectively, as clearly shown in Figure 3. The rails are symmetrically disposed with relation to a diameter of the member D and are formed with guides 33 for slidably supporting ball cages 34 and 35 respectively, above and below the member D. The ball cages are similar in all respects to the ball cage 21 and enclose speed control mechanisms, specifically, a friction drive designated by 34' and 35' consisting of a pair of hardened balls freely movable in the cages and contacting the upper and under surfaces of the member D.

The ball cages are movable in their guides across a diameter of the member D by means of threaded control shafts 36 and 37 passing respectively through opposite sides of the roller cages and constituting means for regulating the adjustments of the friction drives above and below the member D. The shafts 36 and 37 are journaled in the standard 30' and pass through and extend beyond the standard 30 their ends being provided with cranks 36' and 37' for manipulating the shafts to translate the ball cages across the member D as occasion may demand.

Pivotally mounted on the standards 30 and 30', as shown at 38 in Figure 1, are roller cages 39 and 40 carrying rollers E and F respectively, which are forced into contact with the respective friction drives by resilient means, specifically the springs 39' which join the free ends of the cages (see Fig. 3).

The roller trunnions are supported by ball bearings 41, as shown in Figure 11, and the trunnion at one end of each roller is elongated to extend through an aperture in the standard 30, and upon the projecting ends of these trunnions the respective beveled gears 42 and 43 are secured.

It is evident that the roller F, which will be considered and referred to as the tertiary driven member, will have a rotation speed directly proportional to that of the member D and also directly proportional to the distance of the ball cage 35 from the center of the member D. The rotation of this roller F is transmitted by means of the bevel gear 43 through gearing 44 and 45 and 46 suitably supported on the standard 30 (see Figs. 4 and 6) to a beveled gear 47 carried by the control shaft 36 and positioned adjacent the standard 30 so that the roller F serves to translate the ball cage 34 along a diameter of the member D and thus determines the speed of the roller E which will be considered as the secondary driven member.

For the purpose of moving the ball cage 34 more quickly than would be practicable through manipulation of the ball cage 35, the crank 36' is provided to rotate the control shaft 36. Rotation of this shaft causes the shaft to thread itself through the ball cage 34 thus causing a translation of the same. To prevent the movement of the shaft 36 from being transmitted to the roller F a throw-out lever 48 is provided for disengaging a pinion 45' from the gear 45 by sliding the pinion along its splined shaft 49.

The motion of the shaft 37 is transmitted to a compound differential G through a worm 50 and worm wheel 51 and being a measure of the position of the ball cage 35 is used in the computation of the desired result as described more in detail below.

The rotation of the shaft 36 is likewise transmitted to the differential G through a worm 52, worm wheel 53, shaft 54, and bevel gears 55, where it serves as a measure of the position of the ball cage 34, or in other words, of the rotational speed of the roller E.

The bevel gear 42 of the roller E drives a shaft 56 through a differential gearing H provided with a crank 57 by means of which the gearing may be actuated to provide arbitrary settings to the shaft 56 when necessary. The shaft 56 through gears 58 drives a shaft 59 which is operatively associated with the receiving instrument in a system of data transmission involving the balancing of known and unknown resistance in an electrical circuit as described in copending application Serial No. 733,595, filed August 22, 1924. The attachment of such a receiving instrument to the shaft 59 permits the operator of this computing mechanism to know when the roller E is rotating at the same speed in degrees per second as the observer's telescope associated with the sending instrument, and as will be described below, to enable him to adjust the computing mechanism by manipulating the shaft 37 so that the roller E will accurately follow in its rotational velocity, the speed of an observed target in space.

Figure 4:
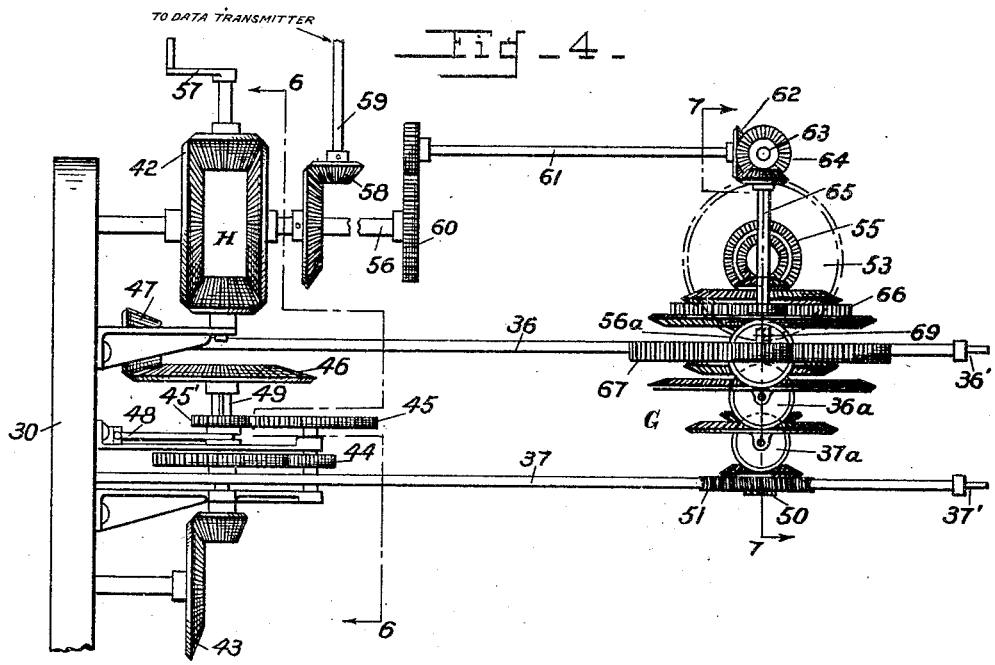
Fig. 4 is a detail view in side elevation of the gearing.
Figure 5:
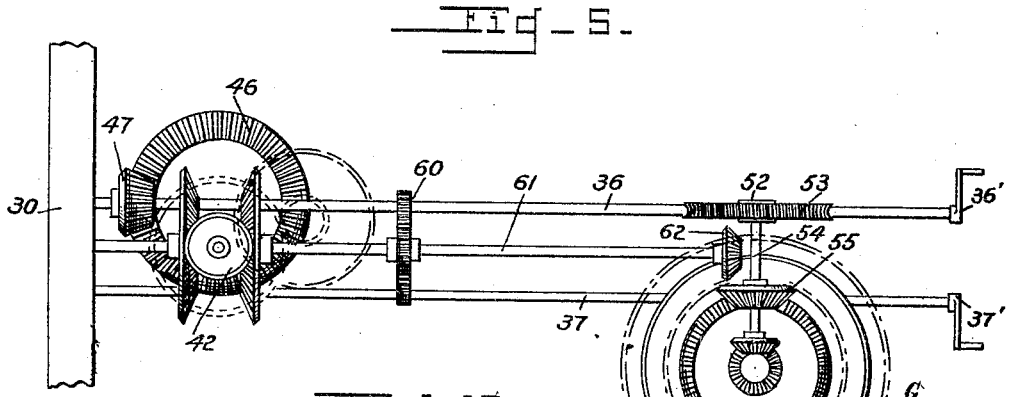
Fig. 5 is a plan view of the same.
Figure 12:
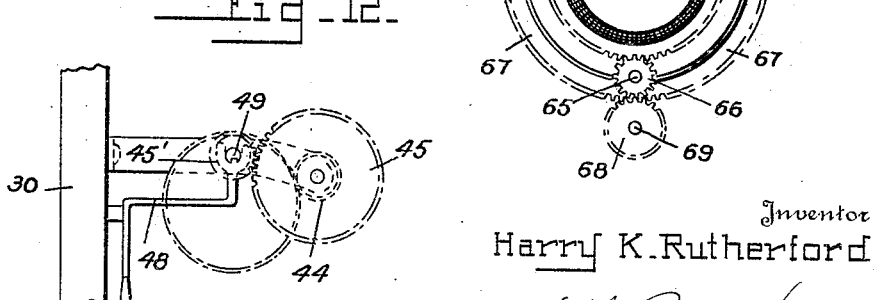
Fig. 12 is a detail view of the throw-out lever.

The shaft 56 also transmits the motion of the roller E to the differential G through spur gears 60, shaft 61, bevel gears 62, shaft 63, bevel gears 64, shaft 65, and pinion 66, as illustrated in Figures 4 and 7.

Referring to Figure 7 the compound differential G consists of the combination of interrelated differentials, the lowermost represented by 37ª, the intermediate by 36ª and the upper by 56ª and having a main gear 67 meshing with a pinion 68 on a shaft 69 which is moved with a velocity equal to the velocities of the shafts 37, 36, and 56. The motion of the shaft 36 is transmitted through the large gear 55 to the differential 36ª and through the small gear 55 to the differential 37ª, the latter arrangement providing for substraction of the value $f'(A_o)t$ of shaft 36 from the value $f''(A_o)t^2+f'(A_o)t$ of shaft 37. The gear ratios of the differential 37ª are fixed to effect a division of the quantity $f''(A_o)t^2$ by 2. The shaft 69 may be connected to such other mechanism as may be required for computing purposes.

Assuming that the shaft 56 is set motion at the same instant as the target and has been kept in continuous agreement with the motion of the same, it is evident that the position of the shaft 56 at any instant will be a measure of the value of the coordinate of the target taken at that instant by the observer's telescope, or in other words, will be proportional to $A_o$.

The adjusting of the speed of rotation of the roller E is accomplished by rotating the shaft 37 through the crank 37', which has the effect of changing the speed of rotation of the roller F which in turn changes the position of the ball cage 34, hence varies the velocity of rotation of the roller E. Therefore, by manipulating the crank 37' so that the receiving instrument on the shaft 59 matches the data of a sending instrument as measured by an observing telescope following the target, the velocity of rotation of the roller E may be made to equal $f'(A_o)$, the rate of change of the co-ordinate of the target in space, or by suitably proportioning the dimensions of the parts, may be made to equal any desired fraction or multiple of that quantity.

The rate of rotation of the roller E being proportional to the rate of change of a co-ordinate of the target $f'(A_o)$ this quantity would be indicated by the position of the ball cage 34 were it not for the fact that the speed of the member D has been multiplied by the factor $1/t$ as previously explained. Since, however, the speed of the roller E has been so adjusted by manipulation of the crank 37' that it is actually equal to that of the target, it follows that the movement of the ball cage 34, as represented by the movement transmitted to the differential G, must have been multiplied by the quantity $t$ in making this adjustment. That is, the displacement of the shaft 36 is equal to the product of $f'(A_o)t$, this being one of the terms required for the solution of Equation (1).

The rate at which the ball cage 34 is translated across the member D is a measure of the rate of change of $f'(A_o)t$. This quantity upon differentiating with respect to $t$ becomes $f''(A_o)t+f'(A_o)$. The position of the shaft 37, which indicates the position of the ball cage 35, hence the speed to which the roller F is rotating and consequently the rate of change of the ball cage 34 would give, therefore, a measure of the valve $f''(A_o)t+f'(A_o)$ were it not for the fact that the speed of the member D has been multiplied by $1/t$. Since, however, the computing mechanism has been so adjusted by the crank 37' that it actually follows the observation of $A_o$ made on the target, the displacement of the shaft 37 must have been multiplied by $t$ in this operation. The displacement of the shaft 37 is, therefore, a measure of the value of expression $f''(A_o)t^2 + f'(A_o)t$.

The value of $f'(A_o)t$ has previously been found from the shaft 36, hence by subtracting this value from the indication of the shaft 37 the value of $f''(A_o)t^2$ will be obtained. Dividing it by two the value of $$f''(A_o)\frac{t^2}{2}$$

needed for the solution of the Equation (1) will be obtained.

We have then on shaft 56 a measure of the valve of $(A_o)$; on shaft 36, a measure of $f'(A_o)t$; and on shaft 37 a measure of the quantity of $f''(A_o)t^2 + f'(A_o)t$. These shafts are all connected to the compound differential G in which the combining of the above quantities so as to solve Equation (1) are performed. The combination of the quantities giving the value of $A_1$ is indicated by the rotation of the shaft 69 which is connected as previously stated to such other mechanism as may be required for computing purposes.

The above description has been limited to a consideration of only the first and second derivatives of $A_o$: namely, $f'(A_o)$ and $f''(A_o)$ thus requring the use of only the two rollers E and F with the two ball cages 34 and 35. It will be evident that higher derivatives may be taken into consideration, if desired, by providing an additional roller and ball cage for each one, power being applied for operating through the member D or through other suitable connections to the motor. In such a case, however, the shaft 37 instead of being manually operated will be driven by the added mechanism in precisely the same manner as the shaft 56 is now driven by the roller F.

It will likewise be apparent that if in solving Equation (1) it may be considered that the second derivative $f''(A_o)$ be zero, the ball cage 34 may be arranged to operate directly on the member C omitting the member D and all parts pertaining thereto and thus simplifying the apparatus.

For the sake of simplicity and clearness, the mathematic deduction of the equation showing the relationship of the various members of the computing device one to the other are omitted. To any one skilled in the art, the mathematical basis of the invention will be readily apparent, and the equation easily worked out for any set of conditions to be met.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. In a computing device, a driving member movable proportional to a time element, a primary and secondary driven member, speed control mechanisms for actuating the driven members through the driving member, the speed control mechanism of the secondary driven member being positioned by the primary driven member, means for indicating the value $A_o$ of an accelerated moving object through the displacement of the secondary driven member.

2. In a computing device, a driven member affording a measure of the value of the coordinate of an accelerated moving object, a secondary variable speed mechanism actuating said member and affording a measure of the value of velocity over an interval of time, a primary variable speed mechanism controlling the secondary mechanism and affording a measure of the value of acceleration, and a compound differential comprising end differentials and an intermediate differential, parts of the end differentials forming parts of the intermediate differential, means for introducing the first mentioned measure to one end differential, means for introducing the second mentioned measure to the other end differential, and means for introducing the last mentioned value to the first end differential and to the intermediate differential.

3. In a computing device, a driving member movable proportionate to a time element, a primary and secondary driven member, speed control mechanisms for actuating the driven members through said driving member, means for regulating the speed control mechanisms, the speed control mechanism of the secondary driven member being positioned by the primary driven member, means for indicating the amount and the rate of movement to be imparted to the secondary driven member, a compound differential comprising end differentials and an intermediate differential, parts of the end differentials forming parts of the intermediate differential, means for introducing the movement of the driving member to one end differential, means for introducing the movement displacing the secondary speed control mechanism to the other end differential, and means for introducing the movement displacing the primary speed control mechanism to the last mentioned end differential and to the intermediate differential.

4. In a computing device, a mechanism embodying an element affording a measure of the value of velocity over an interval of time, an element movable to afford a measure of the value of acceleration and a compound differential comprising end differentials and an intermediate differential, parts of the end differentials forming parts of the intermediate differential, means for introducing the measure of the value of a coordinate to one end differential, means for introducing the measure of the value of velocity to the other end differential, and means for introducing the measure of the value of acceleration to the last mentioned end differential and to the intermediate differential.

HARRY K. RUTHERFORD.